March 30, 1965 D. D. KEMPF ETAL 3,175,502
VARIABLE CAPACITY HYDRAULIC GEAR PUMP
Filed Aug. 13, 1963 2 Sheets-Sheet 1

INVENTORS
DENNIS D. KEMPF
CHARLES A. RAMSEL
BY GERALD D. ROHWEDER
Fryer and Tynsvold
ATTORNEYS March 30, 1965 D. D. KEMPF ETAL 3,175,502
VARIABLE CAPACITY HYDRAULIC GEAR PUMP
Filed Aug. 13, 1963 2 Sheets-Sheet 2
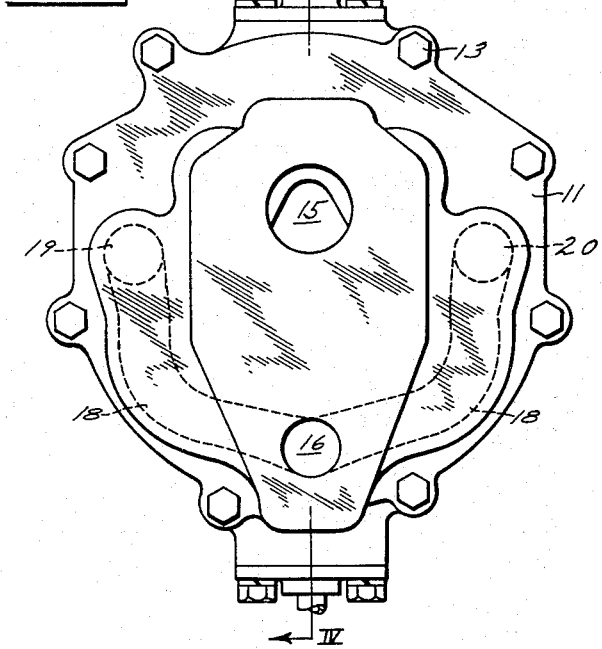
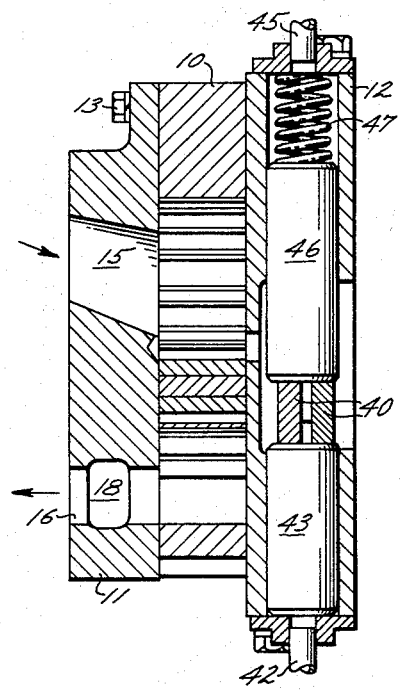
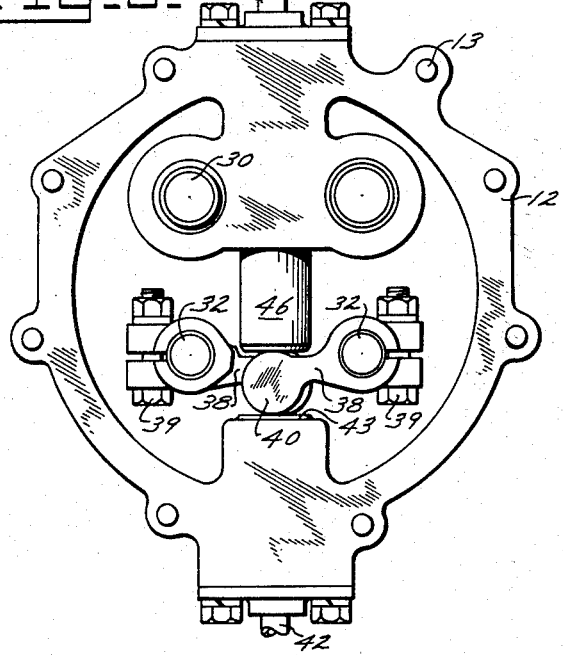
INVENTORS
DENNIS D. KEMPF
CHARLES A. RAMSEL
BY GERALD D. ROHWEDER
Fryer and Tjensvold
ATTORNEYS

United States Patent Office 3,175,502
Patented Mar. 30, 1965

3,175,502
VARIABLE CAPACITY HYDRAULIC GEAR PUMP
Dennis D. Kempf, Rancho Cordova, Calif., and Charles A. Ramsel and Gerald D. Rohweder, Peoria, Ill., assignors to Caterpillar Tractor Co., Peoria, Ill., a corporation of California
Filed Aug. 13, 1963, Ser. No. 301,718
3 Claims. (Cl. 103—120)

This invention relates to a hydraulic gear type pump designed for a substantially constant output throughout a range of operating or driving speeds and particularly adapted to use as a lubricating oil pump for an engine or similar machine.

Engine driven pumps are commonly used for supplying lubricating oil under pressure to various parts of the engine and for maintaining a source of fluid under pressure for the actuation of various engine components and accessories. Since the output of such pumps varies directly with engine speed, it has been common practice to provide pumps capable of delivering maximum volume and pressure requirements at low engine speeds and returning excess volume developed at high engine speeds to a reservoir or source through pressure relief valves or the like. This results in unnecessary use of power, unnecessary wear on pump components and undesirable increases in oil temperatures.

Pumps have been designed to deliver approximate constant output at various speeds but they are complex in structure and costly to manufacture and maintain.

It is an object of the present invention to provide a very simple gear type pump capable of approximating constant output during operation at different speeds and including means adjustable from the exterior of the pump housing to enable automatic adjustment of the pump output by various types of mechanisms which reflect engine speed and, therefore, the speed of the pump driven by the engine. In other words, it is an object to provide means for maintaining a substantially constant output of a pump through a range of variations in its driven speed.

Further and more specific objects and advantages of the invention are made apparent in the following specification wherein reference is made to the accompanying drawings.

In the drawings:

FIG. 3 is a view in front elevation of the pump of the present invention;

FIG. 4 is a central sectional view taken on the line IV—IV of FIG. 3; and

FIG. 5 is a view in rear elevation of the same pump.

Figure 1:
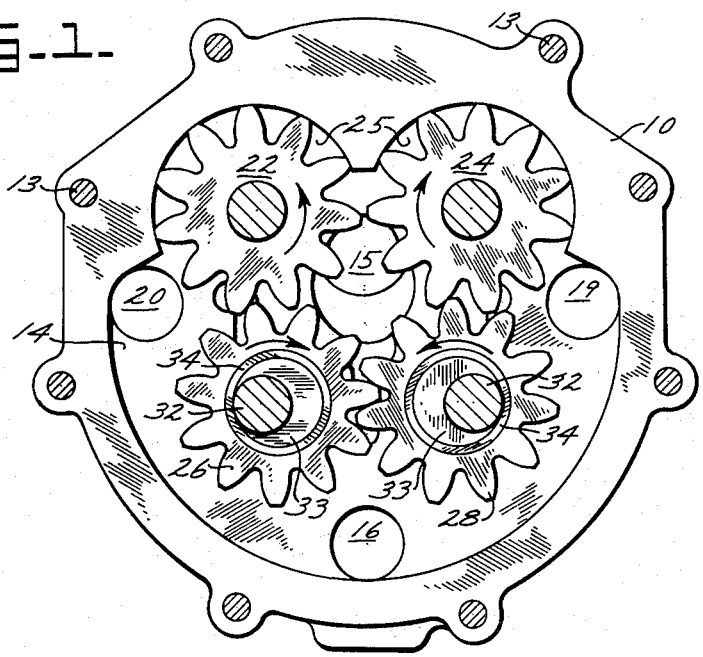
FIG. 1 is a view in rear elevation of a pump embodying the present invention with the rear cover plate removed, illustrating the disposition of the gear type pump units therein.
Figure 2:
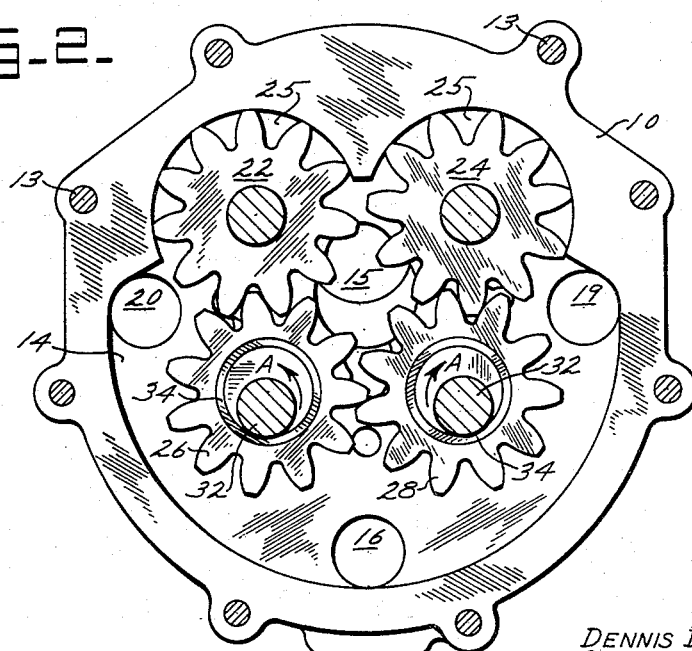
FIG. 2 is a similar view illustrating the pumping units in an adjusted position.

Referring first to FIG. 1 of the drawings, a pump housing is shown at 10 and this housing has a front cover plate shown at 11 in FIGS. 3 and 4 and a back cover plate 12 best shown in FIGS. 4 and 5, all secured together as by capscrews or bolts indicated at 13. A gear cavity 14 in the pump housing, as shown in FIGS. 1 and 2, is in communication with an intake port 15 in the cover plate (see also FIG. 3) and a discharge port 16 communicating through branch passages 18 with two additional discharge ports 19 and 20.

Four gear type pumping units are disposed within the cavity 14 of the housing including two gears 22 and 24 rotatable on fixed axes and in pumping relationship with arcuate housing walls as shown at 25. Two gears 26 and 28 are mounted on adjustable axes and are disposed in pumping relationship through the medium of intermeshing teeth with the gears 22 and 24, respectively, and with each other.

All gears are mounted on trunnions in suitable bearings (not shown) in the front and rear cover plates as is conventional practice and the trunnion of gear 22 is extended externally of the housing to provide a driving shaft as shown at 30 in FIG. 5. This shaft may be driven by the engine in which the pump is used through any suitable driving connection and the gear 22 fixed to the shaft imparts rotation to the gear 26 with which it meshes, while the gear 26 drives gear 28 and the gear 28 drives the gear 24, all in the directions indicated by arrows on the gears in FIG. 1. Thus, in operation the gears 22 and 24 are pumping fluid in counterclockwise and clockwise direction, respectively, between their teeth and the housing walls 25 for delivery to the outlets 19 and 20 which communicate with the main outlet 16. Simultaneously the gears 22 and 26 are pumping fluid entrapped in the pockets between their meshing teeth inwardly as are also the gears 24 and 28, thus returning some fluid toward the intake port 15. A further pumping action takes place between the meshing teeth of the gears 26 and 28 which pump from the inlet area adjacent port 15 toward the main outlet port 16. Variation in the output of the pump is accomplished by adjusting the axes of rotation of the gears 26 and 28 to vary the size of the pockets between their teeth meshing with gears 22 and 24, respectively, and also to vary the size of the pockets between their own meshing teeth. The positions of the gears 26 and 28 are varied through means of eccentric mountings therefor. These gears are supported on identical shafts 32 rotatable in fixed positions in the housing and carrying eccentric trunnions 33 about which the gears rotate on bushings 34. FIG. 1 illustrates the gears disposed for minimum pump output displacement with the teeth between gears 22 and 26 and between gears 24 and 28 loosely meshed to provide large pockets for high volume delivery from the output toward the intake side of the pump. At the same time the meshing teeth between gears 26 and 28 are closely meshed to provide minimum delivery from the intake area toward the outlet 16. The shafts 32 may be rotated to provide maximum pump displacement with the gear elements assuming the positions illustrated in FIG. 2 and where the shafts have been rotated upwardly and inwardly as indicated by the arrows A in FIG. 2. The arc of rotation has been just sufficient to effect close meshing of the teeth between gears 22 and 26 as well as between gears 24 and 28, and loose meshing of the teeth between gears 26 and 28. In this position, through gears 22 and 24 are pumping the same volume per revolution as in the position of FIG. 1, there is very little return toward the intake and a relatively greater volume pumped from the intake toward the outlet 16 by the pumping action of the now loosely meshed gears 26 and 28.

It is desirable that the variation in setting of the pumping elements be controllable from exteriorly of the pump housing so that it is subject to control by any one of several different mechanisms capable of reflecting engine speed. To accomplish this the present invention provides shafts 32 which carry the eccentrics for gears 26 and 28 which extend exteriorly of the housings as shown in FIG. 5 for engagement by a pair of identical crank arms 38. These crank arms are secured to the shaft 32 as by clamp means including bolts 39 and terminate in rounded ends, one of which is shown at 40, so that both crank arms may be adjusted upwardly or downwardly simultaneously. For adjusting the angle of positions of the shafts 32 and eccentrics 33 carried thereby, any one of numerous types of mechanisms may be employed for adjusting the crank arms 38 in response to engine speed. For example, an auxiliary pump driven by the engine or pressure taken from an existing pump such as the fuel oil pump may be utilized by introducing it as through an inlet 42 (see FIG. 4) to urge a piston 43 upwardly into engagement with the ends 40 of the crank arms. This pressure may be opposed by pressure of lower value introduced through an inlet 45 to effect downward movement of the piston 46 also acting against the ends 40 of the crank arm, or alternatively, a spring such as indicated at 47 may be employed to impart moderate resistance to the piston 46. In this manner, pressure from an auxiliary pump or the like which is engine driven increases with engine speed to raise the crank arms 38 adjusting the pump gear elements toward the minimum position of FIG. 2. Alternately the output of the present pump may be used with valving which does not form a part of the present invention but which serves upon variations in pump output pressure to vary pressure in the cylinders of pistons 43 and 46 to accomplish the required adjustment of the gear positions in the pump.

As is apparent from the foregoing, the pump of the present invention may be employed as a constant speed pump capable of delivering a variable output. For example if the pump is operated at constant speed, any suitable means capable of rotating the eccentric supports of gears 26 and 28 would effect variation in pump output.

We claim:

1. A variable capacity hydraulic gear pump comprising a housing having an inlet and an outlet, a pair of rotatable gears positioned to pump fluid from the inlet toward the outlet in the spaces between their teeth and an adjacent housing wall, a second pair of rotatable gears meshing one with each of the first gears and meshing with each other, said second pair of gears being positioned between the inlet and outlet and adapted to pump between their teeth at their meshing zones with the first pair of gears to direct fluid in a first direction from the outlet toward the inlet of the housing, said second pair of gears being adapted to pump fluid between their teeth at their meshing zone with each other in a second direction from the inlet toward the outlet of the housing, and means to move said second pair of gears toward and away from close mesh with the first pair and simultaneously but oppositely away from and toward close mesh with each other to vary the pumping action in said first and second directions and thereby vary the output of the pump.

2. The pump of claim 1 in which the second pair of gears is supported by a pair of adjustable eccentrics, and means to move said eccentrics.

3. The pump of claim 1 in which one gear is driven by external means and the others by the intermeshing relationship claimed.

References Cited by the Examiner

UNITED STATES PATENTS

| | | | |
|---|---|---|---|
| 2,242,687 | 5/41 | Troyer | 103—126 |
| 2,272,309 | 2/42 | Mott | 103—126 |
| 2,526,830 | 10/50 | Purcell | 103—126 XR |
| 3,067,691 | 12/62 | Wiggermann | 103—120 XR |
| 3,068,803 | 12/62 | Wiggermann | 230—158 XR |
| 3,077,835 | 2/63 | Wiggermann | 103—120 XR |

JOSEPH H. BRANSON, Jr., *Primary Examiner.*

WILBUR J. GOODLIN, *Examiner.*